3,438,939
PROCESS FOR PREPARING RESINOUS CONDENSATION COMPOSITIONS BY REACTING A METHYLOLATED SPACED POLYPHENOL WITH A MONOHYDRIC PHENOL AND THEN REACTING THE RESULTANT PRODUCT WITH ALDEHYDE
William R. Brookes, Lanesboro, Mass., assignor to General Electric Company, a corporation of New York
No Drawing. Filed May 12, 1966, Ser. No. 549,465
Int. Cl. C08g 5/10
U.S. Cl. 260—57                                      6 Claims This invention is directed to an improved process for preparing condensation products of methylolated spaced polyphenols and phenol which are subsequently reacted with an aldehyde and to thermoset products therefrom.

Generally, it has been known to prepare particular methylolated spaced polyphenols which are capable of being condensed with phenol and further condensed with an aldehyde to prepare resinous condensation products, which are capable of being advanced to an infusible state in the presence of cross-linking agents by the application of heat. These methylolated spaced polyphonels are prepared by reacting a compound such as paraformaldehyde with a spaced polyphenol, which spaced polyphenol is obtained by reacting, for example, a chlorinated hydrocarbon with phenol. These products and processes for preparing spaced polyphenols and methylolated spaced polyphenols are disclosed in U.S. Patent 2,859,204. This patent discloses preparing resinous condensation products by reacting a mixture of spaced polyphenols with a reactive methylene compound to form a mixture of methylolated spaced polyphenols. These are then reacted with a phenol. The resulting product may be called a cross-condensation product. However, in the practice of the invention of U.S. 2,859,204, which employs sulfuric acid as the acid catalyst, it has been discovered that gelled resinous particles occur which gelled particles result in unsatisfactory molded articles. The articles have surface imperfections or pitted areas due to the gelled particles in the resin. The prior art shows filtering of the resin which would remove any particles. Such filtering is very difficult, time consuming and economically unfeasible for commercial use. In addition, the resins produced with the sulfuric acid catalyst are not easily grindable since they are soft and even tacky in some cases. Even adjusting the sulfuric acid content and aldehyde ratio does not relieve this situation. It has now been surprisingly discovered that the gelled particles can be completely eliminated by an improved process over the above known art as well as providing an easily grindable resin.

Therefore, it is an object of this invention to provide an improved process for preparing resinous condensation products.

A further object of this invention is to provide a resinous product free of gelled particles.

Still another object of this invention is to provide a thermosettable resinous condensation composition.

Yet another object of this invention is to provide a thermoset resinous condensation product.

These and other objects will become apparent to one skilled in the art from the following description thereof.

Briefly, these and other objects are attained by reacting methylolated spaced polyphenols with phenol in the presence of a weak acid and at a temperature of at least 130° C. to produce a condensation product, which may be termed as a cross-condensate, and then reacting the resulting cross-condensate with an aldehyde in the presence of the same weak acid and a temperature of at least 130° C. The resulting resinous condensation product so produced is cabable of being advanced to an infusible state upon exposure to elevated temperatures and in the presence of a cross-linking catalyst. In the practice of this invention, a weak acid is an acid having a dissociation constant in aqueous solution of between $7.5 \times 10^{-3}$ to $7.3 \times 10^{-10}$.

The following examples are set forth to illustrate more clearly the principle and practice of this invention to those skilled in the art and are not meant to be limiting in the practice thereof. Any parts or percentages that are employed herein are parts or percentages by weight.

Example I

To a reaction kettle fitted with a reflux condenser, 20 parts of a spaced polyphenol, prepared by alkylation of phenol with a chlorowax as described in U.S. Patent 2,859,204, and 3.3 parts of paraformaldehyde are added and heated to 105° C. The mixture is then cooled to about 65° C. and 0.3 part of a 50% sodium hydroxide solution is added. The reaction is run for about one hour at 65° C. in order to methylolate the spaced polyphenol. At the end of the methlolation step, 30.8 parts of phenol and 0.9 part of an 85% solution of o-phosphoric acid ($H_3PO_4$) are added. The reaction mixture is heated to 140° C. An additional 4.5 parts of paraformaldehyde are then added over a period of about 30 minutes while maintaining a temperature of 140–145° C. The resin is neutralized and excess phenol is removed under a vacuum and at elevated temperatures.

The resin upon cooling solidifies to a clear single-phase homogeneous resin which is easily grindable.

Example II

Example I is repeated except that sulfuric acid is used in place of phosphoric acid.

The resulting product is a non-homogeneous somewhat tacky solid material containing gelled resinous particles throughout. The resin is difficultly grindable and cakes upon standing.

Example III

Example I is repeated except that herein sulfuric acid is employed as the acid catalyst and no additional paraformaldehyde is used. The resulting resin is a liquid which does not solidify on cooling. The resin is free of gelled particles.

Example IV

Example II is repeated except that in place of the 4.5 parts of paraformaldehyde used therein, two parts of paraformaldehyde are employed herein. The resulting resin does not solidify upon cooling and contains gelled particles.

Example V

Example I is repeated except that a temperature of 100° C. is employed in reacting the condensation product of methylolated spaced polyphenol and phenol with paraformaldehyde. The resulting product is a turbid sticky non-homogeneous solid.

The instant application is directed to an improved process for preparing condensation products of a methylolated spaced polyphenol, a phenol and an aldehyde. The improvement is found in reacting a methylolated spaced polyphenol and a phenol in the presence of a weak acid and at a temperature of at least 130° C. to provide a condensation product which is termed a cross-condensate. This is then followed by reacting the cross-condensate thereof with an aldehyde. The critical feature of the instant invention is that the same weak acid and temperature of at least 130° C. is employed in (1) the reaction of the methylolated spaced polyphenol and phenol to form the cross-condensate, and (2) the reaction of the cross-condensate with an aldehyde. The surprising feature in the practice of the improved process as described above is that a product is obtained which is a clear single-phase homogeneous resin. Depending upon the amount of aldehyde employed in the reaction thereof with the cross-condensate, the resulting resinous condensation product may be either a liquid or a solid. In addition, the resulting resinous condensation product is free of gelled particles. When the resinous condensation product is a solid, it is easily grindable to provide a finely divided resin which does not cake upon standing. The solid resin is the preferred state of the resin since it is suitable for molding applications.

As defined previously, a weak acid, as employed in the practice of this invention, is an acid having a dissociation constant in an aqueous medium of between $$7.50 \times 10^{-3}$$

to $7.3 \times 10^{-10}$. These constants are actually between o-phosphoric acid and boric acid. Sulfuric acid, which is a strong acid, for example, has a dissociation constant of $1.2 \times 10^{-2}$. Examples of some of the weak acids which can be employed in place of the phosphoric acid used in the examples are boric acid, lactic acid and formic acid. The essential feature of the acid is that it must be the type of acid as defined above. The preferred acid to be employed in the practice of this invention is o-phosphoric acid.

As described herein, the resinous condensation reaction products, prepared in accordance with the practice of this invention, are the reaction products of a methylolated spaced polyphenol, a phenol and an aldehyde. The condensation products so obtained are the reaction product of less than one mole of total aldehyde per mole of a phenol. In the instant invention, less than one mole of total aldehyde is reacted per mole of the spaced polyphenol and phenol combined. The total aldehyde reacted is the aldehyde used to methylolate the spaced polyphenol and the aldehyde employed in the reaction thereof with the cross-condensate. Actually it is preferable to react 0.5–0.9 mole of total aldehyde per mole of the spaced polyphenol and phenol combined and more particularly 0.6–0.8 mole thereof.

As used herein, the term aldehyde means any aldehyde which will react with a phenol. These include such aldehydes as paraformaldehyde, formaldehyde, acetaldehyde, butyraldehyde, furfuraldehyde, etc. Preferably the aldehyde employed herein is paraformaldehyde.

In addition, the term phenol means mono-hydroxy benzene (phenol) and substituted phenols containing alkyl groups, alkoxy groups and halogen radicals. Again, the preferred material to be employed in the practice of this invention is phenol, the monohydroxy benzene.

The spaced polyphenols employed in the practice of this invention are those as described in U.S. Patents 2,859,204 and 2,800,512. These are generally prepared by reacting a phenol with a chlorinated hydrocarbon. This may be better termed as alkylation of a phenol with a chlorinated hydrocarbon. While spaced polyphenols are considered the broader term as described in U.S. Patent 2,859,204, they are also known in the art as "waxphenols."

The product prepared by the improved process of this invention require further reaction with an external cross-linking agent in order to be advanced to an infusible state. As is known in the art, such materials containing external cross-linking agents are classified as two-stage resins. Generally, the cross-linking agent can be any material which will cause the resin to advance to a thermoset infusible stage upon the application of heat. In the practice of this invention to prepare thermosettable condensation products, the preferred cross-linking agent is hexamethylenetetramine. The amount of hexamethylenetetramine incorporated with the novolac resin prepared by the improved process of this invention can vary from as little as 5 weight percent to as high as 25 weight percent based on the total weight of the thermosettable resin composition. Preferably the range varies from about 12–18 weight percent thereof.

To provide a thermoset resin, the thermosettable resin as described above is exposed to elevated temperatures in order to advance the resin to an infusible state. The temperatures employed can range from about 85° C. to 200° C. The higher the temperature, the shorter the time required to advance the resin to an infusible state.

The products produced by the improved process of this invention find wide use in such applications as molding powders, laminated products, foundry sands, core binders, adhesives, brake linings, abrasives, etc. In addition, fillers and/or dyes can be incorporated with the resin to achieve certain desirable properties in molding compositions. More specifically, molding compositions formulated with the resinous condensation products of this invention have shorter cure times and thus shorter molding times due to the fact that the resin is advanced to a greater degree with the weak acid catalyst in comparison to a strong acid catalyst. In addition, molded articles employing the resin of this invention have better rigidity as the hot molded article is removed from the mold.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. In an improved method for preparing a resinous condensation product which method comprises reacting methylolated spaced polyphenols with a monohydric phenol in the presence of an acid catalyst to form a cross-condensate; the improvement which consists of (1) reacting the methylolated spaced polyphenols with a monohydric phenol in the presence of a weak acid and at a temperature of at least 130° C., said spaced polyphenols consisting of a polyarylolated hydrocarbon and a phenolic nuclei separated from each other by polymethylene chains, and (a) thereafter reacting the resulting cross-condensate with an aldehyde in the presence of the same weak acid and at a temperature of at least 130° C.; said weak acid having a dissociation constant of between $$7.5 \times 10^{-3}$$

to $7.2 \times 10^{-10}$, and the total aldehyde is less than one mole thereof per mole of spaced polyphenol and phenol combined, said aldehyde being selected from the group consisting of paraformaldehyde, formaldehyde, acetaldehyde, and butyraldehyde.

2. The process of claim 1 wherein the weak acid is o-phosphoric acid.

3. The process of claim 1 wherein the temperature is 130° C. to 200° C.

4. A solid resinous condensation product prepared by the process of claim 1.

5. The product of claim 4 having in admixture therewith 5–25 weight percent of a cross-linking agent based on the weight of the total weight of the resin composition.

6. The product of claim 4 having in admixture 5–25 weight percent of hexamethylenetetramine and a filler.

References Cited

2,859,204  11/1958  Florentine et al. _____ 260—51
3,244,648  4/1966  Bornstein _____ 260—3
3,255,274  6/1966  Yurcick et al. _____ 260—845

WILLIAM H. SHORT, *Primary Examiner.*

HOWARD SCHAIN, *Assistant Examiner.*

U.S. Cl. X.R.

260—51, 55, 56, 59